(12) United States Patent
Seiberling

(10) Patent No.: US 7,404,586 B2
(45) Date of Patent: Jul. 29, 2008

(54) RETRACTABLE ROOF FOR A TRUCK TOPPER

(76) Inventor: Mitch Seiberling, 1051 SE. 55th St., Pleasant Hill, IA (US) 50327

( * ) Notice: Subject to any disclaimer, the term of this patent is extended or adjusted under 35 U.S.C. 154(b) by 0 days.

(21) Appl. No.: 11/834,988

(22) Filed: Aug. 7, 2007

(65) Prior Publication Data
US 2007/0267887 A1 Nov. 22, 2007

Related U.S. Application Data

(63) Continuation-in-part of application No. 11/065,811, filed on Feb. 25, 2005, now abandoned.

(51) Int. Cl.
*B60J 7/00* (2006.01)

(52) U.S. Cl. .............. 296/100.09; 296/100.1; 296/98

(58) Field of Classification Search ............ 296/100.09, 296/100.1, 100.03, 100.04, 100.05, 98
See application file for complete search history.

(56) References Cited

U.S. PATENT DOCUMENTS

| | | | |
|---|---|---|---|
| 2,086,091 A | 7/1937 | Payette | |
| 2,992,040 A | 7/1961 | Groth et al. | |
| 3,416,835 A | 12/1968 | Ohle | |
| 3,472,548 A | 10/1969 | Comisac | |
| 4,138,154 A | 2/1979 | McKeon | |
| 4,252,363 A | 2/1981 | Rodrigue | |
| 4,285,539 A | 8/1981 | Cole | |
| 4,289,346 A | 9/1981 | Bourgeois | |
| 4,639,034 A | 1/1987 | Amos | |
| 4,659,136 A | 4/1987 | Martin et al. | |
| 4,709,956 A | 12/1987 | Bowman | |
| 4,721,336 A | 1/1988 | Jones | |
| 4,867,499 A * | 9/1989 | Stephan et al. | ............ 296/50 |
| 4,883,305 A | 11/1989 | Horton | |
| 5,005,896 A | 4/1991 | Li | |
| 5,186,513 A | 2/1993 | Strother | |
| 5,338,084 A | 8/1994 | Wardell | |
| 5,429,403 A | 7/1995 | Brasher | |
| 5,443,295 A | 8/1995 | Moberly | |
| 5,531,497 A | 7/1996 | Cheng | |
| 5,758,921 A | 6/1998 | Hall | |
| 5,769,482 A | 6/1998 | Kirk | |
| 5,829,813 A | 11/1998 | LaValle | |
| 5,845,957 A | 12/1998 | Hurst | |
| D407,062 S | 3/1999 | Patrovich | |
| 5,938,270 A | 8/1999 | Swanson et al. | |
| 5,951,092 A | 9/1999 | Cissell | |
| 6,000,745 A | 12/1999 | Alexa | |
| 6,149,217 A | 11/2000 | Plamondon | |
| 6,505,878 B1 | 1/2003 | Mascolo | |
| 6,767,043 B1 | 7/2004 | Sanseviero | |
| 2003/0178868 A1 * | 9/2003 | Lapsley | ............ 296/24.1 |

\* cited by examiner

Primary Examiner—Joseph D Pape (57) ABSTRACT

A truck topper having a pair of sidewalls in parallel spaced relation and adapted to be mounted to the bed of a truck at one end and having grooves at an opposite end. The grooves receive a retractable roof such that when attached to a retraction assembly the roof will retract to open the top of the truck topper.

19 Claims, 7 Drawing Sheets

RETRACTABLE ROOF FOR A TRUCK TOPPER

CROSS REFERENCE TO RELATED APPLICATION

This application is a continuation-in-part of Ser. No. 11/065,811, filed Feb. 25, 2005 now abandoned.

BACKGROUND OF THE INVENTION

The present invention relates to a truck topper and more specifically to a truck topper having a retractable roof.

Truck toppers are devices which are adapted for placement on the bed of a standard pickup truck to thereby enclose the pickup truck bed. A standard truck topper has a front end, a rear end, a roof, and side walls. Usually a door is placed in the rear end of the truck topper to allow access to the contents of the pickup bed.

A problem in the art exists in that when items that are taller than the truck topper are placed into the bed of a pickup truck, the truck topper must be removed which is time consuming and physically difficult for one person. To solve this problem, devices having complicated canopy systems with retractable canopies allow the canopy to be retracted for the loading of an item in the truck that is taller than the canopy.

For example, one device has an arcuate bow that supports a canopy that can be moved from an open position to a closed position of the container of a truck. A disadvantage is that the cover moves as a single unit eliminating the structural support of the sidewalls of the topper for securing a load during transport.

In addition, further problems exist with toppers having a retractable roof portion. As one example, without added support, the topper will expand and narrow in response to wind forces during transport. When the topper is not maintained in a square/plum position, it becomes difficult to open and close the retractable roof portion. Also, by using a retractable roof portion, sealing the interior compartment from rain and moisture presents challenges. Current canopies do not effectively solve this problem.

Accordingly, a need exists in the art for a topper for a truck having a roof portion that is independently retractable from the side portions.

Therefore, it is a principle object of the present invention to provide a truck topper that has a retractable roof to allow for easy storage and transport of items taller than the sides of the truck topper.

Yet another object of the present invention is to provide a truck topper having a roof portion that is retracted by a retraction assembly that is manual or automatic.

Another object of the invention is to provide a truck topper that will accommodate tall loads and provide structural support during transport.

Yet another object of the present invention is to provide a truck topper that has a retractable roof that is resilient to the elements.

Still a further object of the present invention is to provide support for a topper to stabilize the topper against wind forces.

One other object of the present invention is to provide sealing and drainage elements to protect the inside compartment from moisture and rain.

These and other objects, features, or advantages of the present invention will become apparent from the specification and claims.

BRIEF SUMMARY OF THE INVENTION

A truck topper that has a pair of side walls that are in parallel spaced relation mounted to the bed of a truck. One edge of the side wall is adapted to be attached to the bed of the truck and the opposite edge has grooves on its interior wall for receiving a roof portion. The roof portion is slidable within the grooves to be moved from closed to open positions. A retraction assembly is attached to the roof portion to facilitate movement of the roof portion between open and closed positions.

DESCRIPTION OF THE PREFERRED EMBODIMENTS

Figure 1:
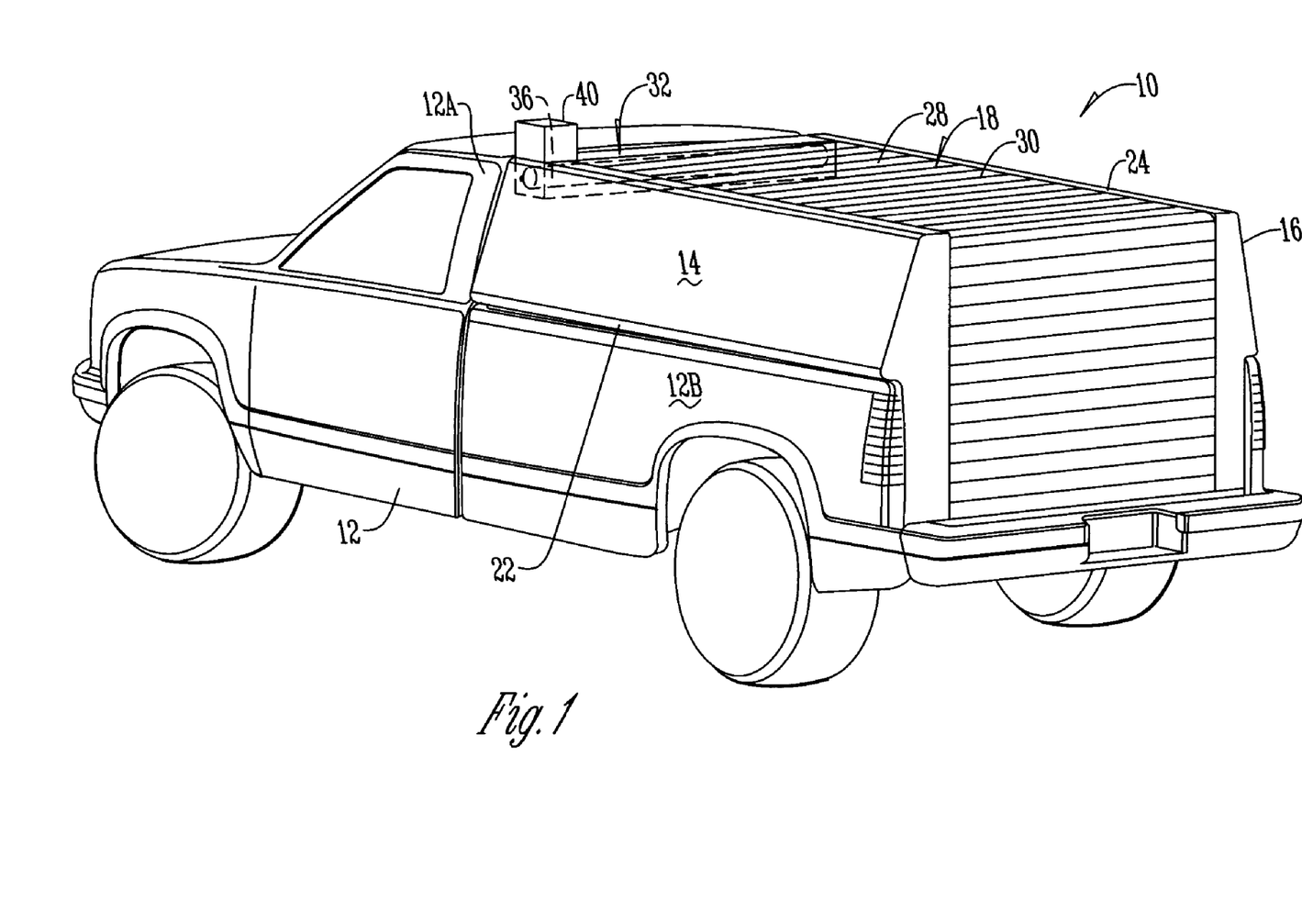
FIG. 1 is a perspective view of the truck topper.
Figure 2:
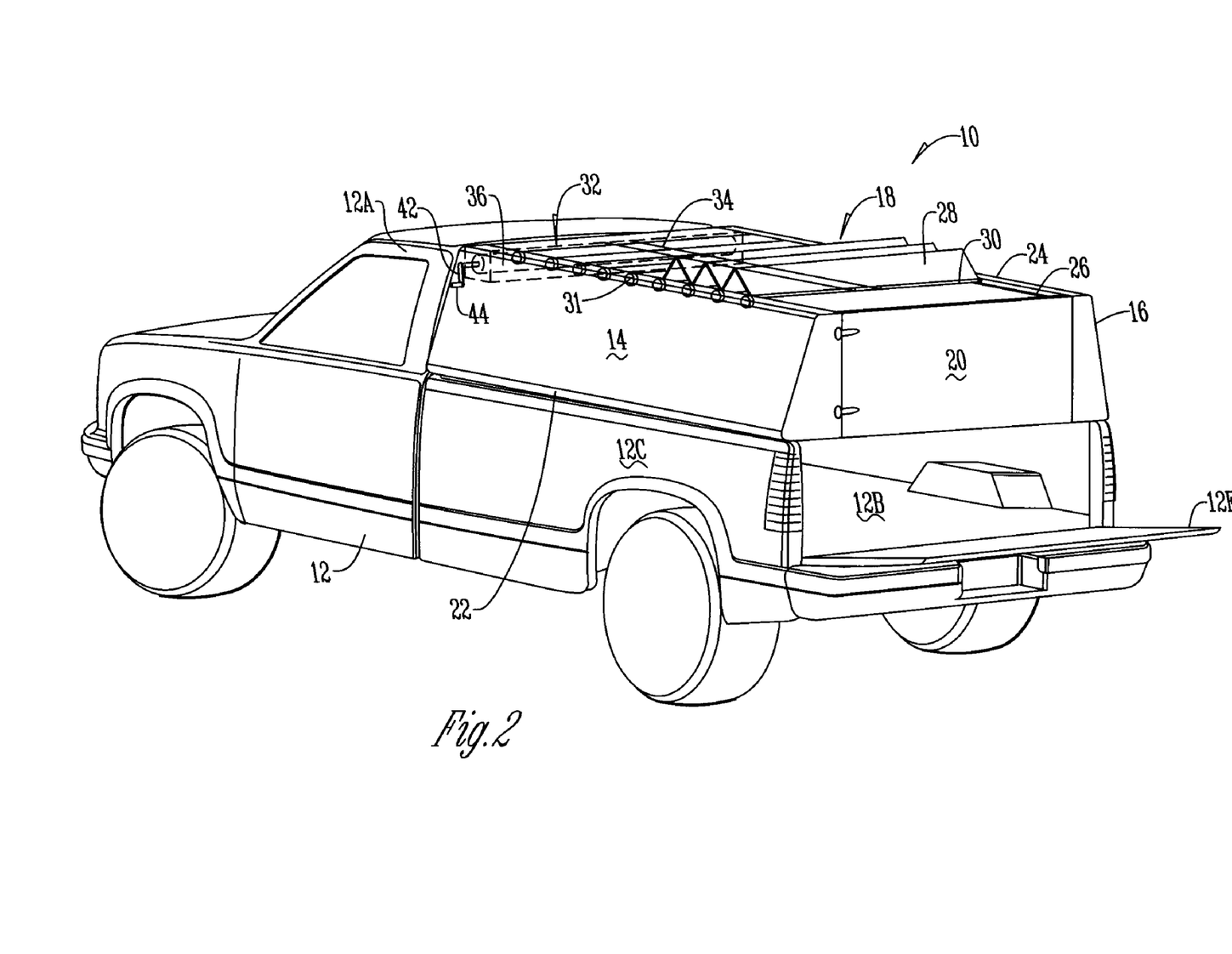
FIG. 2 is a perspective view of an alternative embodiment of a truck topper.
Figure 3:
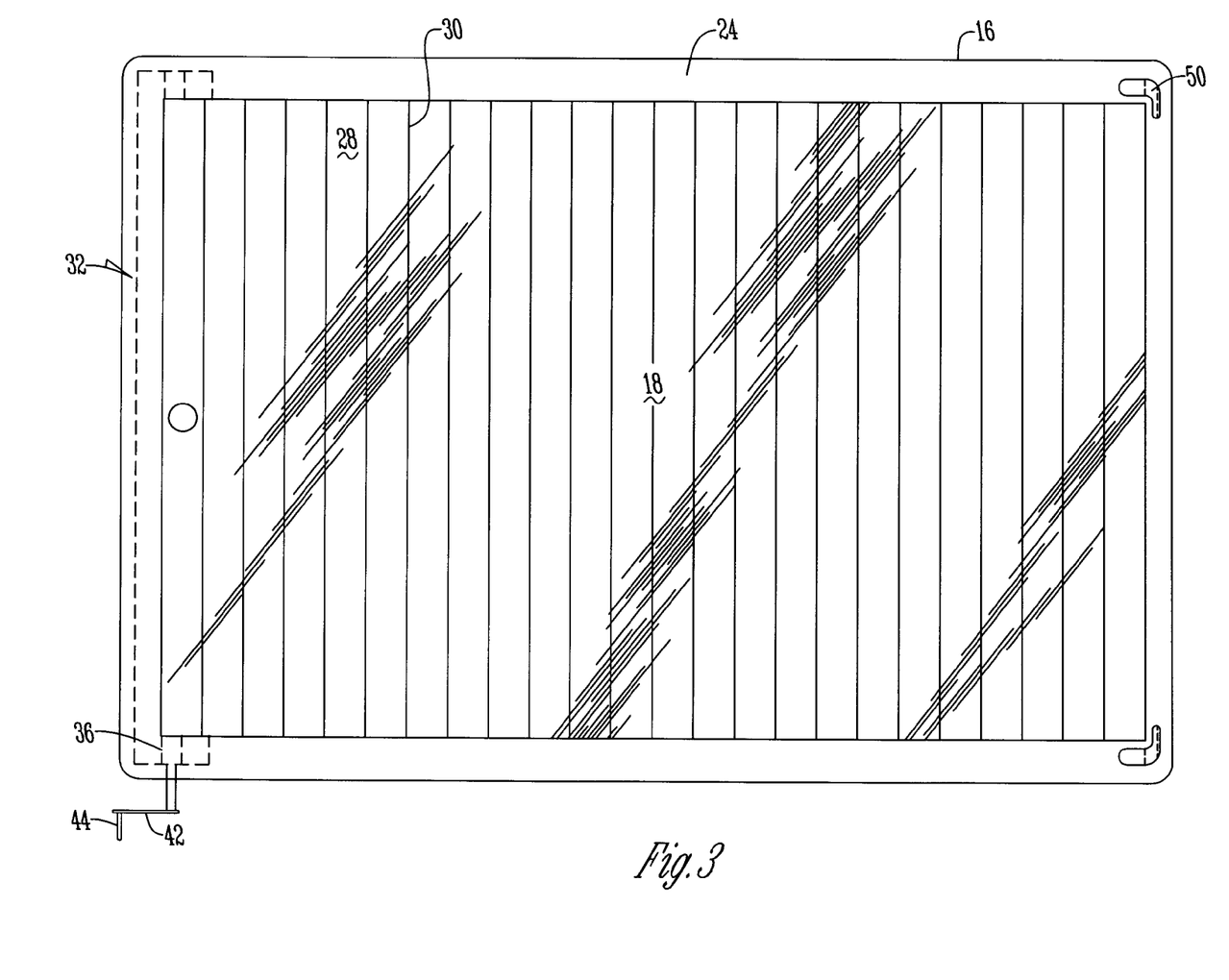
FIG. 3 is a top view of a truck topper.
Figure 4:
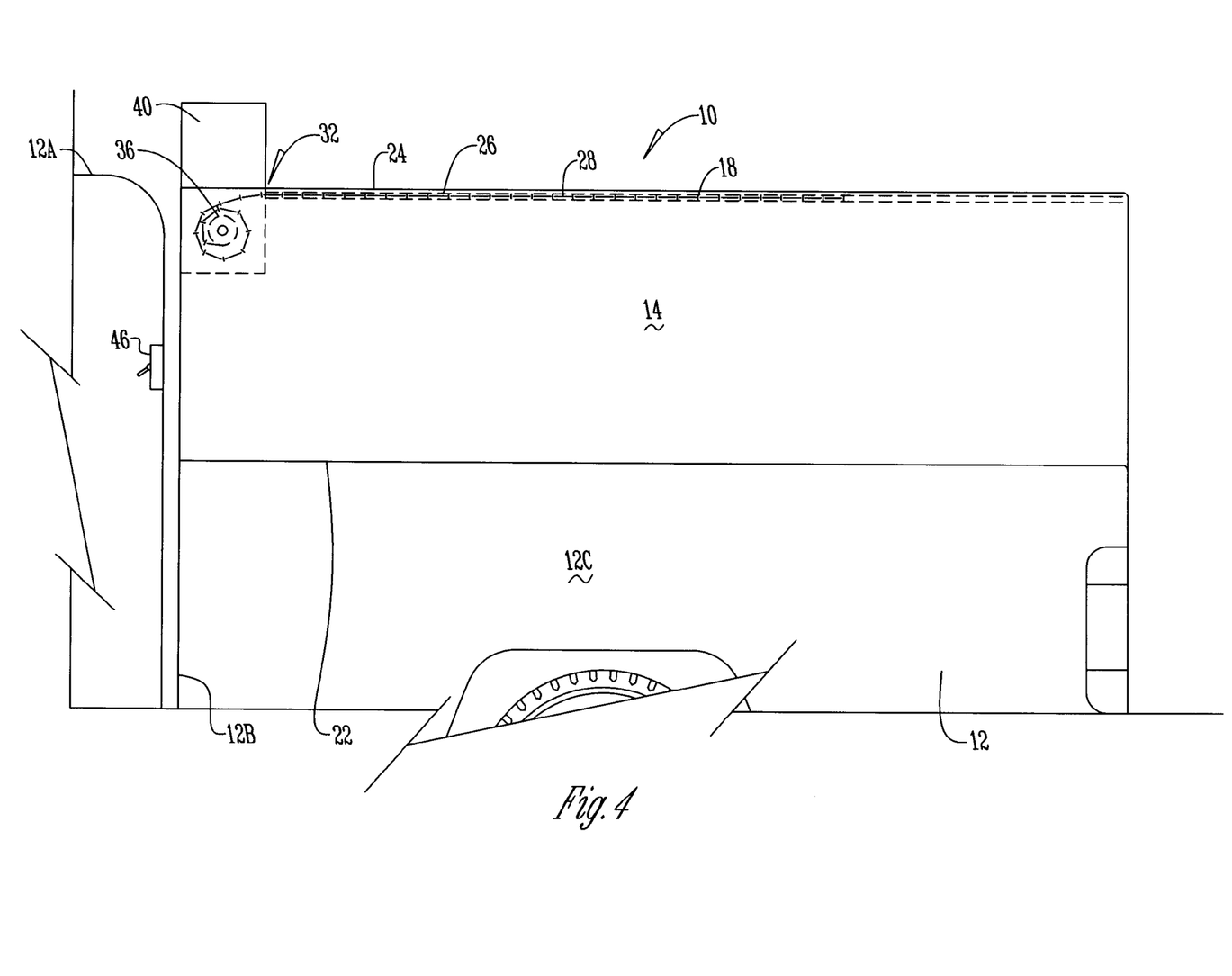
FIG. 4 is a side view of a truck topper.

FIGS. 1-4 show a truck topper 10 that is mounted onto the back of a pickup truck 12. As is well known in the art, a pickup truck 12 has a cab 12a, and a loading compartment 12b that is formed by sidewalls 12c and end wall 12d and a moveable tailgate 12e. The topper 10 has side walls 14 and 16, and a roof portion 18 that preferably extends to the tailgate 12e of the truck 12. Optionally a door 20 (FIG. 2) can be hingedly attached to a side wall 14 or 16 to provide an opening in the topper 10 above the tailgate of the truck 12. In a preferred embodiment the side walls 14, 16 have a bottom edge 22 that is adapted to be attached to the top of the truck 12 and has an opposite top edge 24 with a groove 26 on the interior portion of the side wall 14 or 16. In one example, the roof portion 18 is comprised of a plurality of slats 28 and a plurality of lateral shafts 30 that are positioned to allow the roof to fold like an accordion as best shown in FIG. 2. To provide one to view the contents of the loading compartment, one or all of the slats are made of a translucent glass or plastic material. Attached to the shafts 30 are a plurality of wheels or rollers 31 that are received within the groove 26 of sidewalls 14 and 16. The rollers 31 are moveable within the grooves 26 in order to allow the roof portion 18 to move in a longitudinal direction toward the cab of the pickup 12 and vice versa. Alternatively, other types of roof portions can be used such as resilient plastic or rubber.

A retractor assembly 32 is used to move the roof portion 18 in a longitudinal direction. In one example, as shown in FIG. 2, the retraction assembly 32 has at least one cable 34 that is attached to the roof portion 18 at the end adjacent the tailgate of the truck 12 to pull the roof 18 in a longitudinal direction toward the cab of the truck. The cable 34 is attached to a cylinder 36 that rotates such that the cable will wrap around the cylinder and pull the roof portion 18 toward the cylinder 36. The cylinder 36 is rotated by a crank shaft 42 which is operated either by a power means such as a motor 40, or manually by a handle 44.

In another example, the cylinder 36 is attached to the roof portion 18 at the end adjacent the retractor assembly 32 either directly or by at least one cable 34. As the cylinder is rotated, the roof portion 18 is pulled toward the retractor assembly and the roof portion wraps around cylinder 36. In this manner, the roof portion 18 is moved to an open position allowing access to the bed of the truck 12.

To move the roof portion 18 to a closed position one would pull on the end of the roof portion 18 opposite the retractor assembly in a direction toward the tailgate of the truck exerting sufficient manual force to rotate the cylinder 36 in the opposite direction releasing either the roof portion 18 or the cable 34 from the shaft 36. The power source also could activate to rotate the cylinder in the opposite direction to release and close the roof portion 18. Preferably, an activation switch 46 is mounted within the cab 12a of the truck 12 that is electrically connected to the power source to activate and/or release the power source.

Figure 5:
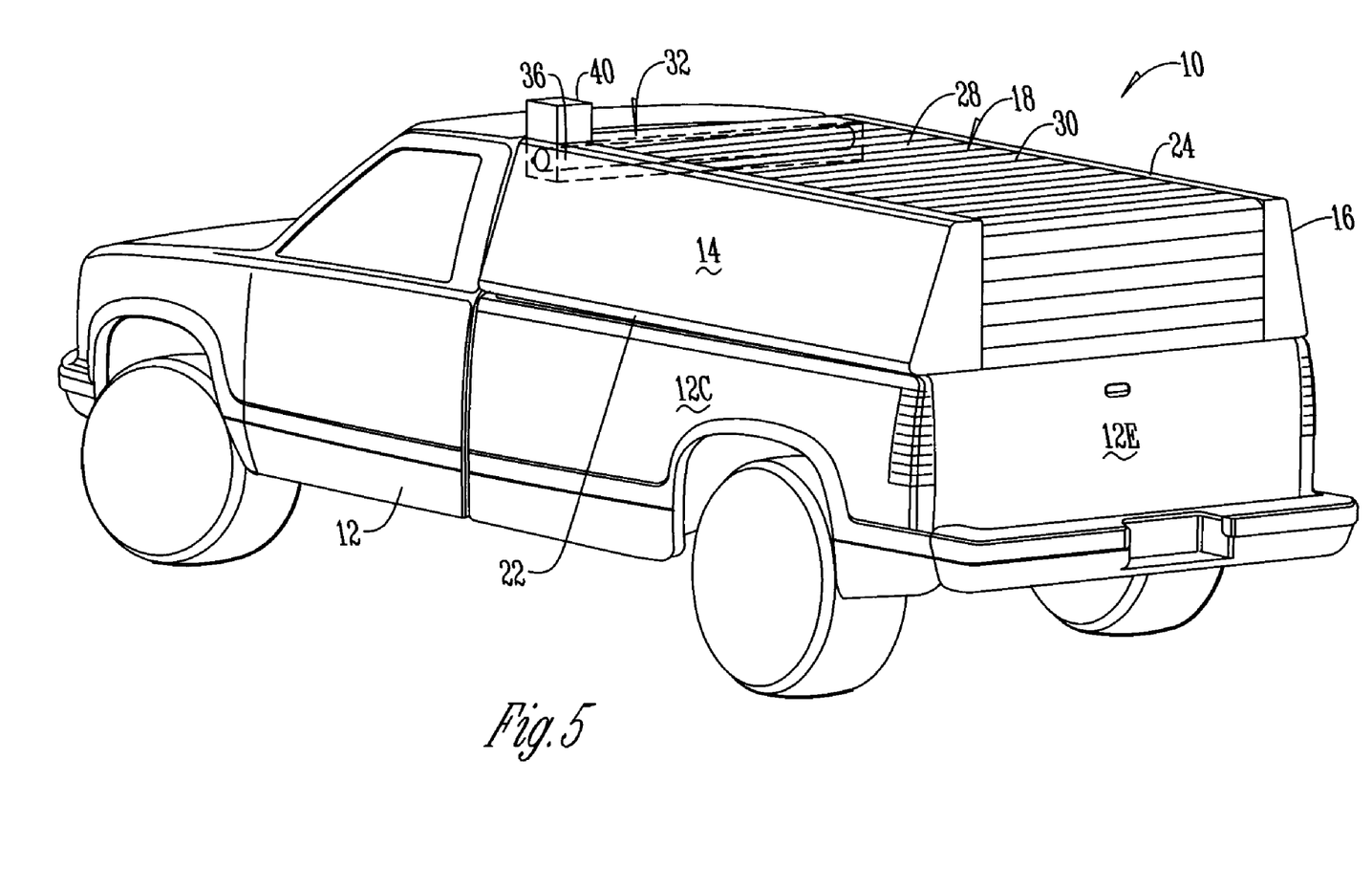
FIG. 5 is a perspective view of a truck topper.

One skilled in the art will appreciate that the truck topper 10 may be made of a fiberglass material or any other resilient material that improves the integrity of the truck topper and also ensures maximum security. Additionally, one skilled in the art will understand that the roof portion 18 can be made of an aluminum material or any rain and weather resistant material that also allows for maximum protection against the elements and others. Also, one skilled in the art will appreciate that by having the door 20 hinged to one of the side walls 14 or 16 that the door 20 of the topper 10 may be opened from the side allowing the roof portion 18 to extend down the sidewalls 14 and 16 of the truck 12 because the door 20 is not attached to the roof portion 18. Also, as shown in FIG. 5, the roof portion may extend down the rearward end of the topper to engage the tailgate when the tailgate is in a closed position. Thus, an improved truck topper with a retractable roof is provided and at least the stated objectives have been met.

Figure 6:
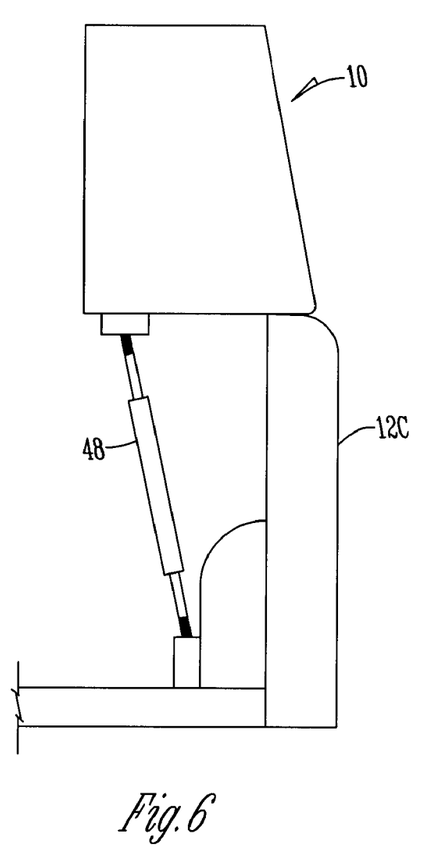
FIG. 6 is an end view of a stabilizing member for a topper.

To add greater stability to the topper 10, particularly during transport when the roof portion 18 is open, one or more stabilizing members 48 are connected to the topper 10 at one end, and to the pickup truck 12 at the opposite end. In one example, as shown in FIG. 6 the stabilizing member 48 is a turnbuckle that is connected to the bottom surface of the topper sidewall 14 at one end. The opposite end of the stabilizing member 48 is mounted to the sidewall 12c of the truck 12. By providing a stabilizing member 48 the topper is maintained in a square and plum position as related to the loading compartment of the truck.

Figure 8:
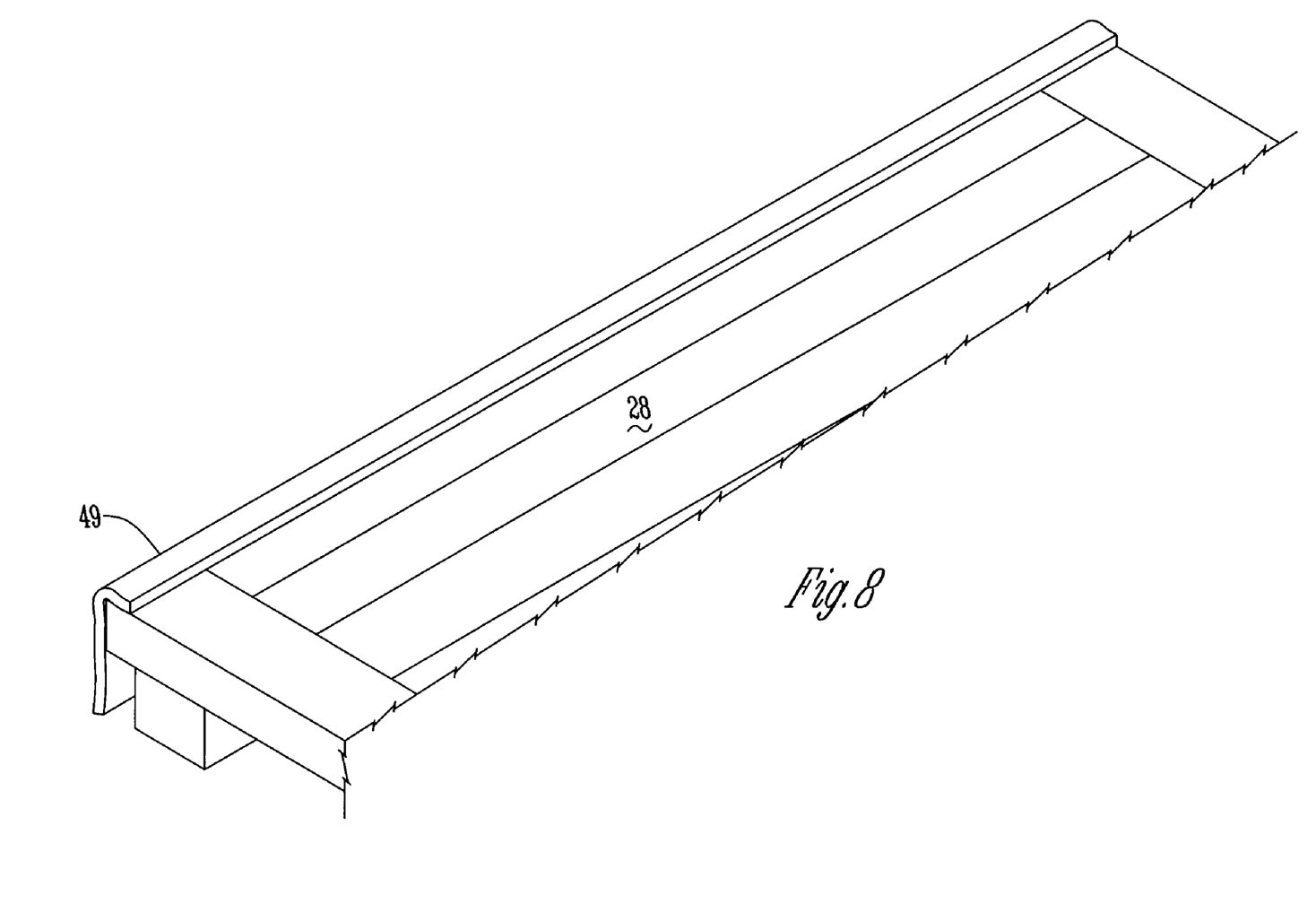
FIG. 8 is a perspective view of a roof cover.

The topper also has a number of drainage and sealing elements that prevent moisture and rain from reaching the loading compartment. One such sealing element includes a roof cover 49 that is attached to the top of the sidewalls 14 of the topper 10 and positioned to cover at least a portion of the retraction assembly 32. This helps prevent moisture from reaching the retraction assembly 32.

Figure 7:
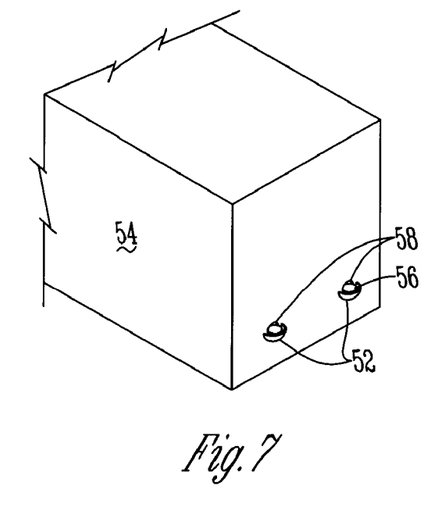
FIG. 7 is a side view of a drainage channel in a topper.

To assist in controlling drainage a channel 50 is provided at the rearward, or tailgate end, of groove 26 that allows moisture to drain from groove 26 down the rear end of the topper 10. Also, plugs 52 are provided in the housing 54 that contain the retraction assembly 32. The plugs 52 within housing 54 in a preferred embodiment comprise a half moon flare 56 to partially cover an overflow drainage hole 58. The flare 56 is larger than the overflow drainage hole 58 so that when water drains from the track to the retraction housing 54 the water does not drip into the truck box. Specifically, the flare 56 forces water back into the housing 54. Simultaneously, if drain tubes from the housing 54 are plugged or non operational water is still allowed through the overflow drainage hole 58.

It will be appreciated by those skilled in the art that other various modifications could be made to the device without the parting from the spirit in scope of this invention. All such modifications and changes fall within the scope of the claims and are intended to be covered thereby.

What is claimed is:

1. A truck topper comprising:
   a pair of fixed sidewalls in parallel spaced relation attached to a truck;
   a roof portion movably received by the sidewalls;
   a retraction assembly operatively connected to the roof portion;
   a door hingedly connected to one of the ends of the topper sidewall wherein the retraction assembly comprises at least one retraction cable attached to the roof portion at an end adjacent a tailgate of the truck;
   a cylinder rotatably connected to the cable; and
   a power means operatively connected to the cylinder to pull the roof portion toward the cylinder;
   at least one stabilizing member connected to the sidewall of the truck topper at a first end and adapted to mount to the truck at a second end.

2. The truck topper of claim 1 wherein the retraction assembly is actuated by a motor.

3. The truck topper of claim 1 wherein the retraction assembly has a crank shaft.

4. The truck topper of claim 1 wherein the roof portion comprises a plurality of slats and shafts.

5. The truck topper of claim 1 wherein the sidewalls are made of fiberglass material.

6. The truck topper of claim 1 wherein the roof portion is made of an aluminum material.

7. The truck topper of claim 1 wherein the retraction assembly has a plurality of cables.

8. The truck topper of claim 1 wherein grooves are formed within the inner sides of the topper sidewalls.

9. The truck topper of claim 8 wherein rollers are rotatably attached to the roof portion and within the grooves of the sidewalls.

10. A truck topper mounted to sidewalls of a pickup truck comprising:
    a pair of fixed sidewalls in parallel spaced relation adapted to and attached to the sidewalls of the pickup truck;
    a roof portion movably received by the topper sidewalls;
    a retraction assembly operatively connected to the roof portion;
    said retraction assembly having a cylinder attached to the roof portion actuated by a motor such that as the cylinder is rotated in a first direction the roof portion wraps around the cylinder to open the roof portion and as the cylinder is rotated in an opposite direction by the motor the roof portion closes;
    at least one stabilizing member connected to the sidewall of the truck topper at a first end and adapted to mount to the truck at a second end.

11. The truck topper of claim 10 wherein the roof portion comprises a plurality of slats and shafts.

12. The truck topper of claim 11 wherein the slats are made of a translucent material.

13. The truck topper of claim 10 wherein an activation switch is mounted within a cab of the pickup truck and electrically connected to the motor.

14. The truck topper of claim 1 wherein the stabilizing member is a turn buckle.

15. The truck topper of claim 10 further comprising a roof cover attached to the sidewalls and positioned to cover at least a portion of the retraction assembly to prevent moisture from reaching the retraction assembly.

16. The truck topper of claim 10 further comprising a housing surrounding the retraction assembly.

17. The truck topper of claim 16 wherein the housing of the retraction assembly contains plugs that flare outwardly from the housing of the retraction assembly to allow overflow drainage from the housing of the retraction assembly.

18. A truck topper mounted to sidewalls of a pickup truck comprising:
- a pair of fixed sidewalls in parallel spaced relation adapted to and attached to the sidewalls of the pickup truck;
- a roof portion movably received by the topper sidewalls;
- a retraction assembly operatively connected to the roof portion;
- said retraction assembly having a cylinder attached to the roof portion actuated by a motor such that as the cylinder is rotated in a first direction the roof portion wraps around the cylinder to open the roof portion and as the cylinder is rotated in an opposite direction by the motor the roof portion closes;
- a housing surrounding the retraction assembly; the housing of the retraction assembly contains plugs that flare outwardly from the housing of the retraction assembly to allow overflow drainage from the housing of the retraction assembly.

19. The truck topper of claim 8 wherein a channel is provided at an end of the groove such that moisture from the groove may drain down an end of the truck topper.

* * * * *